United States Patent
Arhart

[11] Patent Number: 6,133,367
[45] Date of Patent: Oct. 17, 2000

[54] ETHYLENE VINYL ACETATE BLENDS

[75] Inventor: Richard James Arhart, Wilmington, Del.

[73] Assignee: E. I. du Pont de Nemours and Company, Wilmington, Del.

[21] Appl. No.: 09/095,810

[22] Filed: Jun. 11, 1998

Related U.S. Application Data

[60] Provisional application No. 60/049,724, Jun. 17, 1997.

[51] Int. Cl.$^7$ .................................................. C08K 39/00
[52] U.S. Cl. ............................................................ 524/515
[58] Field of Search ............................................. 524/515

[56] References Cited

U.S. PATENT DOCUMENTS

| | | | |
|---|---|---|---|
| 4,191,798 | 3/1980 | Schumacher et al. | 428/95 |
| 4,338,227 | 7/1982 | Ballard | 524/143 |
| 4,403,007 | 9/1983 | Coughlin | 428/95 |
| 4,510,281 | 4/1985 | Smith | 524/229 |
| 4,517,317 | 5/1985 | Tada | 521/95 |
| 4,520,169 | 5/1985 | Hagman et al. | 525/185 |
| 4,532,307 | 7/1985 | Tada | 525/451 |
| 4,910,253 | 3/1990 | Lancaster et al. | 525/60 |
| 5,276,082 | 1/1994 | Forry et al. | 524/504 |
| 5,475,041 | 12/1995 | Weil et al. | 524/100 |
| 5,589,219 | 12/1996 | Hayami | 427/117 |
| 5,604,033 | 2/1997 | Arthurs et al. | 428/350 |
| 5,614,256 | 3/1997 | Wierer et al. | 427/244 |
| 5,627,236 | 5/1997 | Deyrup et al. | 525/173 |

FOREIGN PATENT DOCUMENTS

| | | |
|---|---|---|
| 0703271 | 3/1996 | European Pat. Off. . |
| 07041613 | 2/1995 | Japan . |
| WO 96/05056 | 2/1996 | WIPO . |

*Primary Examiner*—Kriellion Sanders
*Attorney, Agent, or Firm*—Kevin S. Dobson

[57] ABSTRACT

The present invention relates to blends of copolymers having a certain percentage of vinyl acetate monomer with a terpolymer having a certain percentage of vinyl acetate wherein the composition provides heat and flame resistant properties to wires and cable or other manufactured goods prepared from such compositions. The preferred blends comprise or consist essentially of alkylene-vinyl acetate copolymers blended with alkylene/vinyl acetate/CO terpolymers selected from, for example, ethylene-vinyl acetate and ethylene/vinyl acetate/carbon monoxide. The blends are prepared by combining the ingredients with other excipients selected from aluminum trihydrate, carbon black, stearic acid, tri(2-methoxyethoxy) vinyl silane, polymeric hindered phenol, dilaurylthiopropionate, N,N'-m-phenylenedimalemide, and $\alpha,\alpha'$-bis (t-butylperoxy) diisopropylbenzene. The blends of the invention actually simulate a high vinyl acetate content EVA.

13 Claims, No Drawings

ETHYLENE VINYL ACETATE BLENDS

This application claims the benefit of U.S. Provisional Application No. 60/049,724, filed Jun. 17, 1997.

BACKGROUND OF THE INVENTION

1. Field of the Invention

The present invention relates to polymeric blends which are useful as non-halogen flame and oil-resistant materials.

2. Description of Related Art

Ethylene vinyl acetate copolymers and copolymeric blends are known. U.S. Pat. No. 4,338,227 describes various copolymers and uses thereof. Ethylene vinyl acetate copolymeric resins typically offer excellent crack resistance and maintain flexibility over a broad temperature range of −60° C. to 150° C. without the need for plasticizers. Ethylene vinyl acetate carbon monoxide is a known terpolymer—commonly used as a resin modifier for PVC. It is also referred to as a plasticizer. It is also known that while high vinyl acetate ethylene-vinyl acetate copolymers (EVA) formulated with hydrated fillers provide non-halogen flame, low smoke and oil-resistant properties to components (wire and cables) made from such polymeric material, the resin pellets tend to be sticky and agglomerate which provides disadvantages in production and handling. The present inventor has discovered, however, that increasing the vinyl acetate content and advantages associated therewith can be accomplished by formulating a blend as recited and claimed below which provides improved non-halogen flame and oil resistance to materials made from such a blend while concurrently eliminating the disadvantages associated with the high vinyl acetate ethylene copolymers while retaining satisfactory heat resistant properties. The blend of the invention is in a free-flowing undusted form which has lower viscosity for advantages in processing; the blend has improved low temperature capability (flexibility) and it surprisingly has improved or increased tensile strength.

Improved flexibility at low temperatures extends the range of operability for a material. Materials that loose flexibility and become brittle tend to crack and fail with movement.

Lower resin blend viscosity translates to lower wire extruder pressures and easier extrusion with potential for greater through put rates. Free-flowing pellets allow easier handling and use in continuous mixing equipment such as continuous mixers and buss co-kneaders. Convenient air-suction transport of material is possible also. Dusted pellets can result in problems of either too little or too much dusting agent. With too little surface dusting, pellets may agglogmerate and make difficult or impossible air-suction or gravity-flow handling. With too much surface dusting, the dusting agent can become concentrated creating inconsistent flow and other handling difficulties.

High tensile strength provides the mechanical properties needed to meet the requirements of the application and long-term serviceability. Mechanical property requirements vary with the end-use application but generally higher mechanical strength, such as tensile, is desirable for enhanced product durability. The present invention as a blend of known polymeric materials with additional excipients provides significant process advantages by enhancing the polarity of the blend without requiring high vinyl acetate percentages in an ethylene/vinyl acetate copolymer. The inventor has discovered that a blend using a compatible terpolymer having ethylene/vinyl acetate/carbon monoxide provides the necessary polarity presumably because of the relative polarity of the carbon monoxide.

BRIEF SUMMARY OF THE INVENTION

The present invention preferably comprises a polymeric blend of (a) about 70 wt % of an ethylene-vinyl acetate copolymer having a vinyl acetate percentage of about 40 and a melt flow index (MFI) of about 3; and (b) about 30 wt % of an ethylene-vinyl acetate-carbon monoxide terpolymer having a vinyl acetate percentage of about 24; a carbon monoxide percentage of about 8–12 and a MFI of about 35. The present invention preferably further relates to a wire and cable composition comprising or consisting essentially of (a) and (b) above and excipients selected from (c) a non-halogen flame retardant; (d) a process aid; (e) a coupling agent; (f) an antioxidant and (g) a cross-linking agent. Additionally colorants (such as carbon black) may be added to the composition. This wire and cable composition exhibits free-flowing handling characteristics; low temperature capability of less than −20° C. brittleness temperature and a tensile strength of greater than 1200 psi.

The present invention broadly relates to a blend as described above wherein component (a) is 50–95% by weight of the two-component polymeric blend and component (b) is 5–50% by weight relative to the other polymer in the blend. These percentages may vary from the ratios referred to above as long as the targeted or desired physical property set is obtained and depending upon the vinyl acetate content in polymer component (a) and the vinyl acetate content and carbon monoxide content of polymer component (b). This blend is useful as an intermediate mixture which, when blended with the additional excipients to form the wire and cable composition, provides the enhanced physical properties discussed herein.

The term "copolymer" used herein refers to a copolymer of ethylene and vinyl acetate.

The term "terpolymer" used herein refers to an ethylene/vinyl/acetate/carbon monoxide polymer.

The inventor has discovered that materials made from such a blend have enhanced properties and, as such, are also claiming components made from such a blend and a process or method of producing such components from said blend. The blend of components (a) and (b) is useful in a number of applications where flame retardant, low smoke, non-halogen, oil resistant, flexible systems are desirable as, for example, in construction, automotive, and wire and cable. It is desirable to have flame retardant, low smoke jackets in transit systems, shipboard cable, tray cable, and off-shore oil platform cable. Wherever personnel escape is difficult low smoke, flame retardant materials, including wire & cable, are desirable. The high polarity of the blend is useful also in providing strippability for semiconductive shields for power cable and oil resistant jackets. Usefulness of the blend is also seen in automotive ignition wire jackets where flexibility is needed.

The present invention further relates to a method of systematically providing various blends in a ratio range of about 50–95% of component (a) and about 5–50% of component (b) which provide desired physical properties so that the customer may select a particular blend for a particular physical property set to combine with additional excipients for the applications discussed above. The present invention further comprises wires and cables made from the blends or compositions claimed herein.

DETAILED DESCRIPTION

As summarized above, the present invention relates to a polymeric blend having improved physical properties relative to high vinyl acetate ethylene (EVA) copolymers. The ethylene-vinyl acetate copolymers utilized in the blend may be manufactured by means known in the art from commercially available precursors and catalysts or obtained from commercial suppliers. The ethylene-vinyl acetate copolymers useful in the present invention include those with a vinyl acetate composition of about 18 to 60 wt. % and a MFI of less than one to approximately 100. Ethylene-vinyl acetate copolymers with narrower molecular weight distributions and higher molecular weights (lower MFI) provide better physicals. Ethylene-vinyl acetate copolymers are commercially supplied by a number of manufacturers, including DuPont, Millennium Petrochemicals, Nova-Borealis Compounds LLC, AT Plastics Inc., Exxon, ATO Chem, Bayer AG, and others. Most suitable ethylene-vinyl acetate copolymers have a vinyl acetate composition of 28 to 40 wt % and a MFI of 1 to 10. A preferred ethylene-vinyl acetate has a vinyl acetate composition of 40 wt % and a MFI of 3. DuPont manufacturers such a polymer as ELVAX® 40L-03. Grades of ELVAX® which are suitable for use in the invention include those generally known as ELVAX® 450 (18% VA; MI=8); ELVAX® 460 (18% VA; MI=2.5); ELVAX® 470 (18% VA; MI=0.7); ELVAX® 350 (25% VA; MI=19); ELVAX® 360 (25% VA; MI=2); ELVAX® 240 (28% VA; MI=43); ELVAX® 250 (28% VA; MI=25); ELVAX® 260 (28% VA; MI=6); ELVAX® 265 (28% VA; MI=3); ELVAX® 150 (33% VA; MI=43); ELVAX® 40W (40% VA; MI=52); ELVAX® 46L (46% VA; MI=2.5); ELVAX® 46 (46% VA; MI=95). Other ethylene copolymers are commercially available and have higher percentages of VA. These may be suitable provided that a lower percentage of the terpolymer in the blend is utilized. ELVAX® is the proprietary mark of E.I DuPont de Nemours and Company.

The ethylene-vinyl acetate-carbon monoxide terpolymer may be manufactured by means known in the art from commercially available precursors and catalysts or obtained from commercial sources as ELVALOY®.

The EVACO terpolymers useful in the present invention include those with a vinyl acetate content of 18 to 35 wt. %; a carbon monoxide content of 3 to 20 wt. %, and a MFI of five to approximately 100. Ethylene-vinyl acetate—carbon monoxide terpolymers with narrower molecular weight distributions and higher molecular weights (lower MFI) provide better physicals. Ethylene-vinyl acetate—carbon monoxide terpolymers are commercially available from DuPont. Most suitable ethylene-vinyl acetate—carbon monoxide terpolymers have a vinyl acetate composition of 20 to 30 wt. %, a carbon monoxide composition of 8 to 12 wt. % and a MFI of 20 to 50. Preferred ethylene-vinyl acetate—carbon monoxide terpolymers have vinyl acetate compositions of 24.0 or 28.5 wt. %, carbon monoxide compositions of 10 or 9 wt. % respectively, and a MFI of 35. DuPont manufactures such polymers as ELVALOY® 741 and 742, respectively.

The polymeric blend of component (a) and component (b) with the above vinyl acetate content are blended together to simulate the vinyl acetate content of higher vinyl acetate percentage ethylene copolymers. The inventor has discovered that adding an effective amount of a compatible terpolymer having the above range of carbon monoxide can provide enhanced polarity to the blend and ultimately the final wire and cable composition without the need to manufacture an ethylene copolymer with a high vinyl acetate content (>50%).

While components (a) and (b) are the primary ingredients, other additives typical for flame and/or oil resistant compounds should be added depending upon the purpose of the composition and its intended use. These other excipients, ingredients or additives include, for example, HYDRAL-710®, CARBON-BLK-N774®, STEARIC ACID, SILANE-A-172-VINYL®, IRGANOX-1010®, DLTDP, HVA®-NO.-2 and VUL-CUP®-R.

HYDRAL-710 from Alcoa is precipitated aluminum trihydrate with small particle diameter and high surface area which is used as both a mineral filler and a flame retardant. Flame retardancy without halogen is provided by loss of hydrated water at temperatures above 392° F. (200° C.). CARBON-BLK-N774 from Cabot is a black filler which here is simply used as a black colorant. STEARIC ACID is used here as a process aid to enhance release of compound from metal process equipment, such as a Banbury and 2-roll mill. SILANE-A-172-VINYL, tri(2-methoxyethoxy) vinyl silane from OSI Specialties, Inc., is a coupling agent to improve polymer interaction with HYDRAL-710 mineral filler in order to enhance physical properties of the compound. IRGANOX-1010, a polymeric hindered phenol from Ciba Geigy, is the primary antioxidant to provide the compound oxidative stability in the presence of heat and oxygen. DLTDP (dilauryl thio-diproprionate), a secondary antioxidant from Morton International acts to enhance the stabilization capability of the IRGANOX-1010 primary antioxidant.

HVA-NO.-2,N,N$^1$-m-phenylenedimaleimide from DuPont, acts as a coagent to enhance crosslinking with the VULCUP-R peroxide. VULCUP-R , $^1$-bis(t-butylperoxy) diisopropylbenzene from Hercules, is the primary crosslinking agent which requires heating typically above 300° F. (149° C.) for activation. A suitable amount of VULCUP-R peroxide for crosslinking is 1 to 2.5 phr. The designation "phr" defined as parts per hundred rubber refers to the total portion of the polymers which is set at 100. All other ingredients are ratios to 100 total parts of polymer. A preferred amount of VULCUP-R peroxide for a 70/30 blend of components (a) and (b) is 1.85 phr.

Generic equivalents for these compound additives are available from a number of other suppliers and function in essentially the same manner. Other end-use applications with different property and performance requirements use different compound additives. For example, different compound additives are used for the outer strippable semiconductive shield for power cable and for automotive ignition wire jackets. Physical properties and performance are affected by the selection of additive type and also to a lesser extent by the relative ratio of amounts of the additives used.

The process of making a blend according to the invention comprises combining all the above ingredients except for the SILANE in a Banbury® mixer and mixing to a temperature of about 150° F. (65.6° C.); adding the SILANE at said temperature and then mixing to a temperature of about 210° F. (99° C.); holding at 210° F. (99° C.) for about one minute and then sheeting off for slabs on a two-roll mill for the purpose of crosslinking with heat test plaques for subsequent physical property testing. While the ratios of each of the excipients is not critical, the ratio range of these excipients and the ratio range of the (a) and (b) components does affect physical properties and performance. However, a free radical or other initiator is necessary to effect crosslinking of the polymers and polymeric blend.

such as continuous mixers, twin-screw extruders, Buss co-kneaders or a two roll mill used solely. These reaction conditions are the suitable conditions necessary to produce the compositions of the invention. Each slab containing the blend and/or the blend itself was tested for various properties including Mooney Viscosity; Hardness (shore A/D); Modulus (psi); Tensile strength (psi) and Elongation (%). In addition, other physical parameters were tested including percent Swell in hot oil(% Swell); LOI (%)(LOI stands for limiting oxygen index); Trouser Tear (lbf/in) and Brittleness Temperature (° C.). Standard conversion tables can be used to convert the above units to other equivalent units of measurement. The present invention relates to and encompasses products made using the ingredients recited below (as Examples) regardless of the composition of the final product or formulation and to products or compositions having the recited ingredients in the specific ratios.

TABLE 1

| Ingredient grams/(phr) | Comp. 1 | Example 1 | Example 2 | Example 3 | Comp. 2 | Comp. 3 |
| --- | --- | --- | --- | --- | --- | --- |
| ELVAX 40L03 | 800(100) | 600(75) | 425(50) | 212.5(25) | 0 | 0 |
| ELVALOY-741 | 0 | 200(25) | 425(50) | 637.5(75) | 850(100) | 0 |
| LEVAPREN 500HV | 0 | 0 | 0 | 0 | 0 | 850(100) |
| HYDRAL-710 | 1200(150) | 1200(150) | 1275(150) | 1275(150) | 1275(150) | 1275(150) |
| CARBON-BLK-N774 | 24(3) | 24(3) | 25.5(3) | 25.5(3) | 25.5(3) | 25.5(3) |
| STEARIC ACID | 12(1.5) | 12(1.5) | 12.8(1.5) | 12.8(1.5) | 12.8(1.5) | 12.8(1.5) |
| SILANE-A-172-VINYL | 8(1) | 8(1) | 8.5(1) | 8.5(1) | 8.5(1) | 8.5(1) |
| IRGANOX-1010 | 16(2) | 16(2) | 17(2) | 17(2) | 17(2) | 17(2) |
| DLTDP | 8(1) | 8(1) | 8.5(1) | 8.5(1) | 8.5(1) | 8.5(1) |
| HVA-NO. 2 | 16(2) | 14(1.75) | 12.8(1.5) | 10.6(1.25) | 8.5(1) | 17(2) |
| VUL-CUP-R | 20(2.5) | 17.5(2.19) | 16(1.87) | 13.3(1.56) | 10.6(1.25) | 21.2(2.5) |
| TOTAL GRAMS | 2104 | 2099.5 | 2226.1 | 2221.2 | 2216.4 | 2235.5 |
| LOAD FACTOR | 0.8 | 0.8 | 0.8 | 0.8 | 0.8 | 0.8 |
| SPECIFIC GRAVITY | 1.47 | 1.48 | 1.50 | 1.51 | 1.52 | 1.52 |

EXAMPLES

The following examples describe the various blends and compositions which were made according to the invention and further show the physical properties associated with each composition that relate to advantageous performance. In most cases, the comparative examples are those compositions which have 100% of either component (a) or component (b).

As shown in Table 1 below, various percentages of the ingredients or components listed therein were combined except for the silane component and mixed or blended while increasing the temperature in the reaction vessel (Banbury® blender) to a temperature of about 150° F. (65.6° C.) primarily by shear heat; the mixture was blended further and the silane reagent was added and the subsequent mixture blended to a temperature of about 210° F. (99° C.). After stirring for at least an additional minute, the complete blend was dumped and sheeted off for slabs. These compositions may be produced in other conventional mixing equipment The physical properties of the Examples and comparative compositions described in Table 1 are shown below in Table 2. The results suggest that the compositions of the invention (the Examples) have advantageous physical properties. Low temperature flexibility may be measured as a brittleness temperature as in ASTM D746 test method used for the examples here. In this test small test strips are impacted with a force until the temperature is reached at which half of them shatter and fail. Test method ASTM D412 was used to measure tensile strength in the examples. Instron grip separation rate was 20 inches/min. An average of three dumbbells was tested per sample. Mooney Viscosity has its ordinary meaning. ODR stands for oscillating disk rheometry and is a method of measuring the cure rate and state of a material by measuring the torque or force required to oscillate a rotor embedded in the material at a chosen cure temperature as a function of time. A rapid increase in the slope of the torque indicates rapid crosslinking. A high maximum torque indicates a high level of crosslinking.

TABLE 2

|  | Comp. 1 | Example 1 | Example 2 | Example 3 | Comp. 2 | Comp. 3 |
|---|---|---|---|---|---|---|
| Mooney viscosity; ML 1 + 4 @ 100° C.(ASTM D 1646) | 48 | 38 | 30 | 22 | 15 | 45 |
| ODR (ASTM D 2084) |  |  |  |  |  |  |
| MI(in.lb) | 4 | 4 | 4 | 3 | 2 | 5 |
| Mh(in.lb) | 110 | 123 | 128 | 120 | 92 | 95 |
| Mc90(in.lb) | 100 | 111 | 115 | 108 | 83 | 86 |
| T90(min) | 8.1 | 8.4 | 8.7 | 9.1 | 9.5 | 7.7 |
| T s2(min) | 0.8 | 0.8 | 0.9 | 1.1 | 1.5 | 0.8 |
| Original (ASTM D412) |  |  |  |  |  |  |
| Hardness (Shore A) (ASTM D2240) | 85 | 87 | 88 | 87 | 85 | 77 |
| Modulus @ 100%(psi) | 1270 | 1324 | 1384 | 1374 | 1440 | 1096 |
| Tensile Strength(psi) | 1358 | 1347 | 1413 | 1386 | 1461 | 1156 |
| Elongation(%) | 199 | 154 | 150 | 141 | 137 | 180 |
| After 7 days(ASTM D573) @ 150° C. |  |  |  |  |  |  |
| Hardness(A) | 81 | 86 | 84 | 89 | 90 | 78 |
| Modulus @ 100%(psi) | 1452 | 1701 |  |  |  | 1309 |
| Tensile Strength(psi) | 1626 | 1759 | 1950 | 1775 | 1638 | 1338 |
| Elongation(%) | 209 | 136 | 93 | 46 | 33 | 209 |
| Tensile Strength retained(%) | 120 | 131 | 138 | 128 | 112 | 116 |
| Elongation retained(%) | 105 | 88 | 62 | 33 | 24 | 116 |
| After 7 days @ 175° C. |  |  |  |  |  |  |
| Hardness (A/D) | A/84 | 92/53 | 91/68 | 94/70 | A/84 | A/80 |
| Modulus @ 100% | 1621 |  |  |  |  | 1303 |
| Tensile Strength(psi) | 1769 | 1899 | 2147 | 2169 | 857 | 1486 |
| Elongation (%) | 141 | 67 | 25 | 9 | 2 | 147 |
| Tensile Strength retained(%) | 130 | 141 | 152 | 156 | 59 | 129 |
| Elongation retained (%) | 71 | 44 | 17 | 6 | 1 | 82 |
| Volume Swell-70 hrs in ASTM #3 Oil @ 150° C.(ASTM D 471) |  |  |  |  |  |  |
| % Swell | 103 | 87 | 72 | 63 | 51 | 82 |
| LOI(%)(ASTM D 2863) | 28 | 28 | 28 | 30 | 27 | 28 |
| Trouser Tear(ASTM D470) lbf/in | 38.7 | 34.6 | 30.7 | 34.4 | 38.0 | 29.9 |
| Brittleness Temperature(ASTM D746) ° C. | −30.5 | −28.0 | −27.5 | −24.0 | −25.5 | −23.5 |

As indicated from the above table 2, the % Oil Swell diminished considerably as the ELVALOY® and ELVAX® were blended in the ratios as shown above and throughout the ratio curve from 100% ELVAX® to 100% ELVALOY®. Therefore, compositions of the invention have surprisingly improved oil swell properties relative to the non-blends. The results also show that a high VA content (50%) of, for example, LEVAPREN® 500HV available from Bayer AG, Germany, has low Oil Swell but not as low as ELVALOY® 741 (51%).

The Examples presented below (Examples 4–8 and comparatives) demonstrate the optimum blends of the invention and show the associated physical properties. In general, the examples and comparatives were prepared according to the general procedure described above. The various ingredients may be added in any order to the mixer-the results indicated that a 70/30 blend of ELVAX® 40L-03/ELVALOY® 741 provided the optimum ratio along with the additional excipients as presented below.

TABLE 3

| Ingredient grams/(phr) | Examples |  |  |  |  |  |
|---|---|---|---|---|---|---|
|  | Comp. | 4 | 5 | 6 | 7 | 8 |
| LEVAPREN 500HV | 800(100) | 0 | 0 | 0 | 0 | 0 |
| ELVAX 40L03 | 0 | 600(75) | 560(70) | 560(70) | 595(70) | 520(65) |
| ELVALOY-741 | 0 | 200(25) | 240(30) | 240(30) | 255(30) | 280(35) |
| HYDRAL-710 | 1200(150) | 1200(150) | 1200(150) | 1200(150) | 1275(150) | 1200(150) |
| CARBON-BLK-N774 | 24(3) | 24(3) | 24(3) | 24(3) | 25.5(3) | 24(3) |

TABLE 3-continued

| Ingredient grams/(phr) | Examples | | | | | |
|---|---|---|---|---|---|---|
| | Comp. | 4 | 5 | 6 | 7 | 8 |
| STEARIC ACID | 12(1.5) | 12(1.5) | 12(1.5) | 12(1.5) | 12.8(1.5) | 12(1.5) |
| SILANE-A-172-VINYL | 8(1) | 8(1) | 8(1) | 8(1) | 8.5(1) | 8(1) |
| IRGANOX-1010 | 16(2) | 16(2) | 16(2) | 16(2) | 17(2) | 16(2) |
| DLTDP | 8(1) | 8(1) | 8(1) | 8(1) | 8.5(1%) | 8(1) |
| HVA-NO. 2 | 16(2) | 12(1.5) | 14(1.75) | 12(1.5) | 10.6(1.25) | 12(1.5) |
| VUL-CUP-R | 20(2.5) | 14.8(1.85) | 17.6(2.2) | 14.8(1.85) | 12.8(1.5) | 14.8(1.85) |
| TOTAL GRAMS | 2104 | 2094.8 | 2099.6 | 2094.8 | 2220.7 | 2094.8 |
| LOAD FACTOR | 0.8 | 0.8 | 0.8 | 0.8 | 0.8 | 0.8 |
| SPECIFIC GRAVITY | 1.48 | 1.48 | 1.49 | 1.49 | 1.49 | 1.49 |

The following data shows the physical properties of the compositions according to the invention for the optimal blends. The tests were performed on 0.075 inch slabs press cured 15 minutes at 350° F. (177° C.).

TABLE 4

| | Examples | | | | | |
|---|---|---|---|---|---|---|
| | Comp. | 4 | 5 | 6 | 7 | 8 |
| Mooney viscosity; ML 1 + 4 @ 100° C. | 53 | 40 | 37 | 36 | 38 | 37 |
| ODR | | | | | | |
| MI | 5 | 4 | 4 | 4 | 4 | 4 |
| Mh | 100 | 96 | 121 | 101 | 85 | 111 |
| Mc90 | 91 | 86 | 109 | 91 | 77 | 100 |
| T90 | 8.9 | 9.4 | 9.0 | 9.4 | 9.1 | 9.4 |
| T s2 | 0.8 | 1.1 | 0.9 | 1.1 | 1.0 | 1.1 |
| Original Hardness (Shore A) | 76 | 86 | 87 | 85 | 81 | 90 |
| Modulus @ 100%(psi) | 991 | 1206 | 1403 | 1280 | 1237 | 1322 |
| Tensile Strength(psi) | 1039 | 1219 | 1421 | 1289 | 1276 | 1331 |
| Elongation(%) | 262 | 186 | 180 | 164 | 195 | 173 |
| After 7 days @ 150° C. Hardness | 78 | 80 | 90/48 | 81 | 80 | 87 |
| Modulus @ 100% | 1122 | 1539 | 1752 | 1599 | 1546 | 1746 |
| Tensile Strength | 1266 | 1571 | 1812 | 1656 | 1599 | 1787 |
| Elongation | 204 | 144 | 116 | 129 | 156 | 111 |
| Tensile retained | 122 | 129 | 128 | 128 | 125 | 134 |
| Elongation retained | 78 | 77 | 64 | 79 | 80 | 64 |
| After 7 days @ 175° C. | | | | | | |
| Hardness (A/D) | 76 | 88 | 87 | 92/56 | 79 | 90 |
| Modulus @ 100% | 1296 | | | | | |
| Tensile Strength | 1305 | 1624 | 1556 | 1916 | 1755 | 1928 |
| Elongation | 123 | 60 | 32 | 55 | 65 | 47 |
| Tensile strength retained | 126 | 133 | 110 | 149 | 138 | 145 |
| Elongation retained volume Swell-70 hrs in ASTM #3 Oil @ 150° C. | 47 | 32 | 18 | 34 | 33 | 27 |
| % Swell | 79 | 96 | 80 | 82 | 101 | 85 |
| LOI | 28 | 26 | 27 | 28 | 28 | 28 |
| Trouser Tear LBF/IN | 31.3 | 34.3 | 46.1 | 31.9 | 43.3 | 35.9 |
| Brittleness Temperature ° C. | −27 | −25 | −23 | −26 | −25 | −25 |

The units in Table 4 and the ASTM test methods are the same as in Table 2. Example 5 did not heat age as well as Example 6. Example 4 had a high % Oil Swell. The formulation containing 70/30 ratio of the polymers and the sample having a 1.5/1.85 ratio of HVA NO. 2/VUL-CUP®-R had the best balance of properties when compared to, for example, 50% VA content EVA.

Additional experiments were conducted which compared the effect of varying the ELVALOY® terpolymer by VA and CO content. For example, ELVALOY® 742 was utilized in place of the 741 version-the percent VA in 741 is 24 wt % with CO content at 10% versus 742 which has a VA content of 28.5% and a CO content of 9% with both having melt flow indexes (MFI) of 35 (decigrams/10 min.) These terpolymers were combined with the ELVAX® in a 70/30 ratio and blended with the preferred excipients referred to above. The physical results in the tests discussed above were similar for both blends as illustrated by examples 9 and 10 in Table 5.

TABLE 5

| Ingredient (grams/phr) | Comp. | Examples 9 | 10 |
|---|---|---|---|
| LEVAPREN 500 HV | 800(100) | 0 | 0 |
| ELVAX 40L-03 | 0 | 560(70) | 595(70) |
| ELVALOY-741 | 0 | 240(30) | 0 |
| ELVALOY-742 | 0 | 0 | 255(30) |
| HYDRAL-710 | 1200(150) | 1200(150) | 1275(150) |
| CARBON-BLK-N774 | 24(3) | 24(3) | 25.5(3) |
| STEARIC ACTD | 12(1.5) | 12(1.5) | 12.8(1.5) |
| SILANE-A-T72-VINYL | 8(1) | 8(1) | 8.5(1) |
| IRGANOX-1010 | 16(2) | 16(2) | 17(2) |
| DLTDP | 8(1) | 8(1) | 8.5(1) |
| HVA-NO. 2 | 16(2) | 12(1.5) | 12.8(1.5) |
| VULCUP-R | 20(2.5) | 14.8(1.85) | 15.7(1.85) |
| TOTAL GRAMS | 2104 | 2094.8 | 2225.8 |
| LOAD FACTOR | 0.8 | 0.8 | 0.8 |
| SPECIFIC GRAVITY | 1.48 | 1.49 | 1.49 |
| COMPOUND PROPERTIES | | | |
| Mooney viscosity; ML-1 + 4 at 100° C. (ASTM D1646) | 55 | 37 | 38 |
| ODR (ASTM D2084) | | | |
| $M_l$ (in. lb) | 6 | 4 | 4 |
| $M_h$ (in. lb) | 102 | 100 | 100 |
| $M_c90$ (in. lb) | 93 | 90 | 90 |
| T90(min.) | 8.5 | 9.1 | 9.0 |
| T52(min.) | 0.8 | 0.9 | 0.9 |
| Press cured plaques - 15 min at 350° F. (177° C.) | | | |
| Original (ASTM D412) | | | |
| Hardness (Shore A/D) (ASTM D2240) | 81 | 91/45 | 90/44 |
| Modulus at 100% (psi) | 887 | 1204 | 1246 |
| Tensile strength (psi) | 944 | 1226 | 1292 |
| Elongation (%) | 197 | 180 | 164 |
| After 7 days at 150° C. (ASTM D573) | | | |
| Hardness (Shore A) | 76 | 88 | 88 |
| Modulus at 100% (psi) | 1034 | 1497 | 1548 |
| Tensile strength(psi) | 1123 | 1512 | 1612 |
| Elongation (%) | 199 | 115 | 121 |
| Tensile strength retained (%) | 119 | 123 | 125 |
| Elongation retained (%) | 101 | 64 | 74 |
| After 7 days at 175° C. (ASTM D573) | | | |
| Hardness (Shore A/D) | 79 | 84 | 92/59 |
| Modulus at 100% (psi) | 1174 | — | — |
| Tensile strength(psi) | 1242 | 1698 | 1612 |
| Elongation (%) | 116 | 49 | 46 |
| Tensile strength retained (%) | 132 | 138 | 125 |
| Elongation retained (%) | 59 | 27 | 28 |
| Volume Swell-70 hrs. In ASTM #3 oil at 150° C. (% swell) (ASTM D471) | 78 | 88 | 90 |
| LOI (%) (ASTM D2863) | 25.4 | 25.6 | 25.6 |
| Trouser tear (lbf/in) (ASTM D470) | 28.8 | 35.0 | 34.7 |
| Brittleness temperature ° C. (ASTM D746) | −22 | −23 | −23.5 |

Evaluation of the 70/30 Blend in Automotive Ignition Wire Jackets

Further demonstration of the utility of the compositions of the invention in the wire and cable industry where flame and heat resistant compounds are essential for safe performance is illustrated by automotive ignition wire jacket example 11 in Table 6. Considerable advantage of the 70/30 blend is realized in tensile strength and brittleness temperature.

TABLE 6

| | Examples | |
| --- | --- | --- |
| Ingredient (grams/phr) | Comp. | 11 |
| LEVAPREN 500 HV | 1000(100) | 0 |
| ELVAX ® 40L-03 | 0 | 700(70) |
| ELVALOY ® -741 | 0 | 300(30) |
| HYDRAL-710 | 750(75) | 750(75) |
| CARBON-BLK-N774 | 30(3) | 30(3) |
| STEARIC ACID | 10(1) | 10(1) |
| SILANE-A-172-VINYL | 10(1) | 10(1) |
| IRGANOX-1010 | 20(2) | 20(2) |
| DLTDP | 10(1) | 10(1) |
| HVA-NO. 2 | 10(1) | 7.5(0.75) |
| VULCUP-R | 25(2.5) | 18.5(1.85) |
| TOTAL GRAMS | 1865 | 1856 |
| LOAD FACTOR | 0.8 | 0.8 |
| SPECIFIC GRAVITY | 1.29 | 1.31 |
| COMPOUND PROPERTIES | 32 | 19 |
| Mooney viscosity; ML-1 + 4 at 100° C. (ASTM D1646) | | |
| ODR (ASTM D2084) | 2 | 1 |
| $M_l$ (in. lb) | | |
| $M_h$(in. lb) | 24 | 26 |
| $M_c 90$ (in. lb) | 22 | 24 |
| T90(min.) | 9.1 | 9.7 |
| T52(min.) | 1.2 | 1.6 |
| Press cured plaques - 15 min at 350° F. (177° C.) | | |
| Original (ASTM D412) | | |
| Hardness (Shore A) | 62 | 79 |
| Modulus at 100% (psi) | 487 | 875 |
| Tensile strength (psi) | 1125 | 1826 |
| Elongation (%) | 254 | 257 |
| After 7 days at 150° C. (ASTM D573) | | |
| Hardness (Shore A) | 65 | 80 |
| Modulus at 100% (psi) | 589 | 1156 |
| Tensile strength (psi) | 1419 | 1983 |
| Elongation (%) | 250 | 175 |
| Tensile strength retained (%) | 1126 | 109 |
| Elongation retained (%) | 98 | 68 |
| After 7 days at 175° C. (ASTM D573) | | |
| Hardness (Shore A) | 66 | 86 |
| Modulus at 100% (psi) | 614 | — |
| Tensile strength (psi) | 1290 | 1528 |
| Elongation (%) | 195 | 66 |
| Tensile strength retained (%) | 115 | 84 |
| Elongation retained (%) | 77 | 26 |
| After 7 days at 200° C. (ASTM D573) | | |
| Hardness (Shore A) | 84 | 88 |
| Modulus at 100% (psi) | | |
| Tensile strength (psi) | 363 | 819 |
| Elongation (%) | 2 | 10 |
| Tensile strength retained (%) | 32 | 45 |
| Elongation retained (%) | 1 | 4 |
| After 18 hours in IRM 902 oil at 121° C. (ASTM D412) | | |
| Hardness (Shore A) | 45 | 48 |
| Modulus at 100% (psi) | 596 | 693 |
| Tensile strength (psi) | 974 | 1079 |
| Elongation (%) | 168 | 140 |
| Tensile strength retained (%) | 87 | 59 |
| Elongation retained (%) | 66 | 54 |
| Volume Swell - 18 hrs in IRM 902 Oil at 121° C. (% Swell) (ASTM D471) | 45 | 61 |
| Trouser tear (lbf/in) (ASTM D470) | 22.6 | 29.8 |
| Brittleness temperature ° C. (ASTM D746) | −35.5 | −64 |
| Dielectric strength (v/mil) (ASTM D149) | 425 | 463 |

Evaluation of the 70/30 Blend in Strippable Semiconductive Shields for Power Cable Semiconductive strippable shield compounds require good mechanical strength, heat resistance, conductivity, and strippability. The latter characteristic is obtained through differences in polarity between the semicon and non-polar insulation. Polar high vinyl acetate ethylene copolymers are typically used. The 70/30 blend is sufficiently polar to provide the strippability needed for the application.

The results shown above demonstrate the utility of the compositions of the invention in, for example, the wire and cable industry where flame and heat resistant compounds are essential for safe performance.

What is claimed is:

1. A flame and oil resistant thermoset composition, comprising, a blend of
   (a) 50–95 wt % relative to component (b) of an ethylene-vinyl acetate copolymer having a vinyl acetate percentage of about 18–60 wt % and a melt flow index (MFI) of <1 to about 100 decigrams/10 min; and
   (b) 5–50 wt % of an ethylene-vinyl acetate-carbon monoxide terpolymer having a vinyl acetate percentage of 18–35 wt %; a CO percentage of 3–20 wt % and a melt flow index (MFI) of 5 to about 100 decigrams/10 min; and
   (c) wire and cable acceptable excipients, wherein at least one crosslinking agent is included, and wherein a plasticizer is not required as an acceptable excipient.

2. A composition according to claim 1 wherein component (a) is selected from an ethylene vinyl acetate copolymer having a vinyl acetate content of 28 to 46 wt % and an MFI of 1 to 10 and component (b) is selected from an ethylene vinyl acetate carbon monoxide terpolymer having a vinyl acetate percentage of 20–30 wt %; a carbon monoxide percentage of 8–12 wt % and an MFI of 20–50.

3. A composition according to claim 2 wherein component (a) is 70% by weight relative to the total weight of (a)+(b) and component (b) is 30% by weight.

4. The composition according to claim 3 wherein said composition exhibits free-flowing without pellet massing at storage; low temperature capability of less than −20° C. brittleness temperature and a tensile strength of 1200–1300 psi.

5. A flame and oil resistant thermoset composition comprising:
   (a) about 50–95 wt % of an ethylene-vinyl acetate copolymer having a vinyl acetate percentage of about 18–60 wt. % and a melt flow index (MFI) of about <1–100; and
   (b) about 5–50 wt % of an ethylene-vinyl acetate-carbon monoxide terpolymer having a vinyl acetate percentage of about 18–35 wt. %; a carbon monoxide percentage of about 3–20 wt. % and a MFI of 5 to about 100;
   (c) a non-halogen flame retardant;
   (d) a process aid;
   (e) a coupling agent;
   (f) an antioxidant and
   (g) a cross-linking agent;
wherein the composition does not require a plasticizer.

6. The composition according to claim 5 wherein component (a) is selected from an ethylene vinyl acetate copolymer having a vinyl acetate content of 28 to 46 wt % and an MFI of 1 to 10 and component (b) is selected from an ethylene vinyl acetate carbon monoxide terpolymer having a vinyl acetate percentage of 20–30 wt %; a carbon monoxide percentage of 8–12 wt % and an MFI of 20–50.

7. The composition according to claim 6 wherein component (a) is 70% by weight relative to the total weight of (a)+(b) with a vinyl acetate wt. % of about 40 and an MFI of about 3; and component (b) is 30% by weight with a vinyl acetate percentage of about 24; a carbon monoxide percentage of about 8–12 and MFI of about 35.

8. A method of simulating a high vinyl acetate content ethylene-vinyl acetate copolymer in a flame resistant thermoset composition comprising blending a copolymer selected from
   (a) 50–95 wt % relative to component (b) of an ethylene-vinyl acetate copolymer having a vinyl acetate percentage of about 18–60 wt % and a melt flow index (MFI) of <1 to about 100 decigrams/10 min; and a terpolymer selected from
   (b) 5–50 wt % of an ethylene-vinyl acetate-carbon monoxide terpolymer having a vinyl acetate percentage of 18–35 wt %; a CO percentage of 3–20 wt % and a melt flow index (MFI) of 5 to about 100 decigrams/10 min; and further blending (a) and (b) with,
   (c) a wire and cable acceptable excipient to form a flame retardant composition, wherein at least one crosslinking agent is included, and wherein a plasticizer is not required as an acceptable excipient.

9. A method according to claim 8 wherein component (a) is selected from an ethylene vinyl acetate copolymer having a vinyl acetate content of 28 to 46 wt % and an MFI of 1 to 10 and component (b) is selected from an ethylene vinyl acetate carbon monoxide terpolymer having a vinyl acetate percentage of 20–30 wt %; a carbon monoxide percentage of 8–12 wt % and an MFI of 20–50.

10. A method according to claim 8 wherein the excipients are selected from a non-halogen flame retardant; a process aid; a coupling agent; an antioxidant and a cross-linking agent.

11. A wire and cable made with a composition according to claims 1–7.

12. A method of systematically selecting a composition comprising a blend of
   (a) 50–95 wt % relative to component (b) of an ethylene-vinyl acetate copolymer having a vinyl acetate percentage of about 18–60 wt % and a melt flow index (MFI) of <1 to about 100 decigrams/10 min; and
   (b) 5–50 wt % of an ethylene-vinyl acetate-carbon monoxide terpolymer having a vinyl acetate percentage of 18–35 wt %; a CO percentage of 3–20 wt % and a melt flow index (MFI) of 5 to about 100 decigrams/10 min; and
   (c) wire and cable acceptable excipients, wherein at least one crosslinking agent is included, and wherein a plasticizer is not required as an acceptable excipient, and wherein said selection provides a thermoset composition having the desired physical properties for a flame resistant application.

13. A process for producing a flame resistant thermoset wire and cable composition comprising blending under suitable conditions:

(a) 50–95 wt % relative to component (b) of an ethylene-vinyl acetate copolymer having a vinyl acetate percentage of about 18–60 wt % and a melt flow index (MFI) of <1 to about 100 decigrams/10 min; and (b) 5–50 wt % of an ethylene-vinyl acetate-carbon monoxide terpolymer having a vinyl acetate percentage of 18–35 wt %; a CO percentage of 3–20 wt % and a melt flow index (MFI) of 5 to about 100 decigrams/10 min; and (c) wire and cable acceptable excipients, wherein at least one crosslinking agent is included, and wherein a plasticizer is not required as an acceptable excipient to form the flame resistant wire and cable composition.

* * * * *